United States Patent
Torkington (10) Patent No.: US 12,455,316 B2
(45) Date of Patent: Oct. 28, 2025

(54) CHECKING DATA INTEGRITY BY COMPARING ERROR-CHECK SIGNALS GENERATED ON DIFFERENT CLOCK CYCLES

(71) Applicant: Imagination Technologies Limited, Kings Langley (GB)

(72) Inventor: Ross Martin Torkington, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 18/588,819

(22) Filed: Feb. 27, 2024

(65) Prior Publication Data

US 2024/0319272 A1     Sep. 26, 2024

(30) Foreign Application Priority Data

Feb. 27, 2023   (GB) ..................................... 2302801

(51) Int. Cl.
| | | |
|---|---|---|
| *G01R 31/3185* | (2006.01) | |
| *G01R 31/317* | (2006.01) | |
| *G06F 11/10* | (2006.01) | |

(52) U.S. Cl.
CPC ........... *G01R 31/318525* (2013.01); *G01R 31/31725* (2013.01); *G06F 11/1048* (2013.01)

(58) Field of Classification Search
CPC ...... G01R 31/318525; G01R 31/31725; G06F 11/1048; G06F 11/006
See application file for complete search history.

(56) References Cited

U.S. PATENT DOCUMENTS

| | | | |
|---|---|---|---|
| 8,365,049 B2 | 1/2013 | Pribbernow et al. | |
| 2006/0247881 A1* | 11/2006 | Laquai | G01R 31/31725 702/117 |
| 2007/0226600 A1 | 9/2007 | Ogawa | |
| 2010/0153824 A1 | 6/2010 | Pribbernow et al. | |
| 2020/0259506 A1* | 8/2020 | Gilda | H03M 13/1575 |
| 2023/0008476 A1* | 1/2023 | Chen | G06F 11/0757 |
| 2023/0213580 A1* | 7/2023 | Makkar | G01R 31/3187 714/727 |

OTHER PUBLICATIONS

E. S. Sogomonyan, S. Weidling and M. Goessel, "A new method for correcting time and soft errors in combinational circuits," 2013 IEEE 16th International Symposium on Design and Diagnostics of Electronic Circuits & Systems (DDECS), Karlovy Vary, Czech Republic, 2013, pp. 283-286, (Year: 2013).*

* cited by examiner

*Primary Examiner* — Cynthia Britt
(74) *Attorney, Agent, or Firm* — Potomac Law Group, PLLC; Vincent M DeLuca (57) ABSTRACT

A set of payload flip-flops receives an input instance of a payload, and outputs an output instance from which a first instance of an error check signal is generated. One or more error check flip-flops receive the first instance and output a second instance. The input payload instance is clocked into the payload flip-flops if a payload enable signal is asserted, and the first error-check signal instance is clocked into the error check flip-flops if an error check enable signal is asserted. The input payload instance is input to the set of payload flip-flops over two clock cycles, and the payload enable signal is asserted for the two clock cycles. The error check enable signal is asserted on the second cycle. The first instance of the error check signal is compared with the second instance and an error signal is asserted if they do not match.

18 Claims, 6 Drawing Sheets

CHECKING DATA INTEGRITY BY COMPARING ERROR-CHECK SIGNALS GENERATED ON DIFFERENT CLOCK CYCLES

CROSS-REFERENCE TO RELATED APPLICATIONS AND CLAIM OF PRIORITY

This application claims foreign priority under 35 U.S.C. 119 from United Kingdom Application No. 2302801.2 filed on Feb. 27, 2023, the contents of which are incorporated by reference herein in their entirety.

TECHNICAL FIELD

The present disclosure relates to a circuit for data integrity generation and checking, such as by means of a parity bit or error correction code (ECC).

BACKGROUND

Errors in data can be detected using parity information, or detected and optionally corrected using ECC information. E.g. processors are increasingly used in functional safety (FuSa) applications that are required to meet certain safety standards (e.g. ASIL-B in ISO26262). One way to check the operation of the circuitry, such as to facilitate ASIL-B certification, is to apply an error check such as a parity check or ECC protection to some or all of the flip-flops in a design. This guards against random errors due to random bit flips in the flip-flops, e.g. caused by cosmic radiation.

To implement the check in a circuit such as a processor, some or all of the flip-flops of the circuit may be divided into sets. E.g. each set may consist of eight flip-flops. These may be described as the payload flip-flops, as these are the flip-flops which hold the actual data content to be checked.

A given set of payload flip-flops is arranged to receive an input instance of a payload signal, consisting of an individual respective binary signal input to each of the flip-flops of the set. The set of payload flip-flops is arranged to be clocked by either a rising or falling edge of a clock signal. This means that, if the payload flip-flops are enabled at the time of the clock edge, then upon the relevant clock edge, the current value of the input instance of the payload signal will be latched into the set of payload flip-flops and thus become available as an output instance of the payload signal of the set. However if there is a bit-flip while the payload signal is held in flip-flop, then the output instance of the payload signal will become not equal to the input instance that was originally input. For this reason error check circuitry may be associated with each set of flip-flops. The error check circuitry comprises error-check signal generating circuitry and comparison circuitry.

For each set of payload flip-flops to be checked, associated error-check signal generating circuitry is arranged to receive the input instance of the payload signal and generate a first instance of an error check signal, e.g. a parity bit or ECC. This error check signal is clocked into a corresponding set of one or more error-check flip-flops (depending on the size of the signal) on the same edge of the same clock signal that clocks the payload input signal into the payload flip-flops, such that the first instance of the error check signal is latched into the error-check flip-flops and becomes available at the output of the error check flip-flop(s). Another, duplicate instance of the error-check signal generating circuitry is arranged to receive the output instance of the payload signal from the output of the set of payload flip-flops, and performs the same error-check signal generation operation on the output instance as was performed in the input instance of the payload signal. The error-check signal generating circuitry at the output pf the payload flip-flops thereby generates a second instance of the error-check signal based on the output instance of the payload signal. If all is well, the input and output instances of the payload signal should be the same. However there could be a bit flip in one of the flip-flops.

Therefore comparison circuitry is arranged to compare the second instances of the error-check signal with the first instance as output from the error-check flip-flop(s). If the two instances of the error-check signal do not match, this is indicative of there having been a bit-flip in one of the payload flip-flops (or error-check flip-flop), and in response the comparison circuitry will raise an error signal.

The arrangement is replicated across some or all of the flip-flops of the design, which could be 10,000s or 100,000s of flip-flops or more.

SUMMARY

An issue with the above-described error check circuitry is that for a given set of payload flip-flops, it requires a duplication of the error-check signal generating circuitry (e.g. parity bit generating circuitry or ECC generating circuitry) per set of payload flip-flops to be checked: one lot of circuitry at the input of the payload flip-flops and another duplicate of the same circuitry at the output of the payload flip-flops. This duplication of circuitry incurs a lot of silicon area, especially over a large circuit such as a processor. It would be desirable to find an alternative mechanism that does not require a duplication of the error-check signal encoding circuitry.

According to one aspect disclosed herein, there is provided a circuit comprising: a set of one or more payload flip-flops, arranged to receive an input instance of a payload signal comprising a respective binary signal being input to each of the payload bit flip-flops, and to output an output instance of the payload signal comprising a respective binary value as currently latched into each payload-bit flip-flop; and error check signal generating circuitry arranged to perform an operation on the output instance of the payload signal to generate a first instance of an error check signal comprising one or more bits; a respective one or more error check flip-flops arranged to receive the one or more bits of the first instance of the error check signal from the error check signal generating circuitry, and to output a second instance of the error check signal comprising a respective binary value as currently latched into each error check flip-flop. The circuit also comprises a clock arranged to generate a clock signal which clocks the input instance of the payload signal into the set of payload flip-flops if a payload enable signal of the payload flip-flops is currently asserted, and which clocks the first instance of the error-check signal into the one or more error check flip-flops if an error check enable signal of the error check flip-flops is currently asserted. The circuit further comprises timing control circuitry and comparison circuitry. The timing control circuitry is configured to input the input instance of the payload signal to the set of payload flip-flops over two cycles of the clock signal, a first cycle and a second cycle following the first cycle, and to hold the payload enable signal as asserted for the two clock cycles so as to latch the input instance of the payload signal into the payload flip-flops in each of the first and second cycles. The timing control circuitry is further configured to assert the error check enable signal on the second of the two cycles, so as to latch the first instance of the error check signal into the at least one error check flip-flop on the second cycle. The comparison circuitry is arranged so as, at least on the second cycle, to compare the first instance of the error check signal from the error check signal generating circuitry with the second instance of the error check signal from the one or more error check flip-flops and assert an error signal if the first and second instances do not match.

The presently disclosed circuitry thus avoids the need to duplicate the error-check signal generating circuitry (e.g. parity bit generating circuitry or ECC encoding circuitry) by instead re-using the same circuitry on different clock cycles.

The second cycle may be the cycle immediately following the first cycle. However this is not essential. The timing control circuitry may be configured to assert the error check enable signal on the second of the two cycles but not the first, so as to latch the first instance of the error check signal into the at least one error check flip-flop on the second cycle but not the first. Alternatively the error check enable signal could be asserted on the first cycle as well if the error signal is suppressed during the first cycle, which may be done anyway as in embodiments the error signal is deemed not valid in the first cycle. Note also that the error-check enable signal may be a separate signal than the payload enable signal, or alternatively the payload enable signal may be used as the error-check enable signal or the error-check enable signal may be derived from the payload enable signal.

In embodiments, the set may comprise a plurality of payload bit flip-flops.

In embodiments the operation which the error check signal generating circuitry is configured to perform may comprise a parity calculation, the error check signal comprising a parity bit. Alternatively the operation which the error check signal generating circuitry is configured to perform may comprise an error correction code (ECC) encoding; the error check signal comprising an ECC comprising a plurality of bits.

In embodiments the circuit may be incorporated in a processor. In embodiments the circuit may be duplicated multiple times across multiple respective sets of flip-flops of the processor.

In embodiments the processor may configured so as, in response to the error signal being asserted, to perform any one or more of: raising an interrupt to an interrupt handler of the processor, halting execution of one or more threads on the processor, halting all execution by processor, running an exception handler process, disabling a part of the circuit comprising the set of flip-flops, or outputting a warning to a user via a user interface The circuit or processor may be embodied in hardware on an integrated circuit. There may be provided a method of manufacturing, at an integrated circuit manufacturing system, a circuit or processor in accordance with any embodiment disclosed herein. There may be provided an integrated circuit definition dataset that, when processed in an integrated circuit manufacturing system, configures the system to manufacture the circuit or processor. There may be provided a non-transitory computer readable storage medium having stored thereon a computer readable description of the circuit or processor that, when processed in an integrated circuit manufacturing system, causes the integrated circuit manufacturing system to manufacture an integrated circuit embodying the circuit or processor.

There may be provided an integrated circuit manufacturing system comprising: a non-transitory computer readable storage medium having stored thereon a computer readable description of the circuit or processor of any embodiment disclosed herein; a layout processing system configured to process the computer readable description so as to generate a circuit layout description of an integrated circuit embodying the circuit or processor; and an integrated circuit generation system configured to manufacture the circuit or processor according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

This Summary is provided merely to illustrate some of the concepts disclosed herein and possible implementations thereof. Not everything recited in the Summary section is necessarily intended to be limiting on the scope of the disclosure. Rather, the scope of the present disclosure is limited only by the claims.

BRIEF DESCRIPTION OF THE DRAWINGS

Examples will now be described in detail with reference to the accompanying drawings in which.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

As mentioned, errors in data can be detected using parity information, or detected and optionally corrected using ECC information. For instance, processors are increasingly used in functional safety (FuSa) applications that require means to meet certain safety standards (e.g. ASIL-B in ISO26262). One way to facilitate ASIL-B certification or the like is to apply parity or ECC protection to all flops in a design. Conventionally this is achieved by generating parity or ECC information in the cycle preceding a payload signal being captured in a register (with the parity or ECC information being captured alongside it). Separate logic then continually checks that the stored payload is consistent with the stored parity/ECC information.

When applied to all flops in a design, using separate logic for generating and checking parity/ECCs can incur a significant area, timing, and power overhead. It would be desirable to mitigate one, some or all of these penalties.

To address this, there is disclosed herein an alternative form of error checking circuitry which, instead of requiring duplicate logic, captures the payload signal twice and using the same logic for both generating and checking parity or ECC information. This will reduce area, be less detrimental to timing, and may also be less detrimental to power consumption. A known type of parity/ECC generation uses the same calculation as parity/ECC checking but they occur in different clock cycles-before and after a payload signal is captured. The disclosed error checking circuitry may be applied across some or all of the sets of flip-flops in the device design.

The payload signal is captured and then the parity/ECC information is captured in the following cycle. This presents a one-cycle window where data could be corrupted without an error being detected. To eliminate this blind spot, the payload signal is captured a second time (in the same set of flops as before and in the same cycle that the parity/ECC information is captured). From this point on, parity/ECC is calculated on the second capturing of the payload signal and compared against the parity/ECC information that was stored based on the first capturing of the payload signal.

The payload will remain valid for two cycles, but this would not prevent the receiver of the payload from forwarding it and/or processing it after the first capture. The error detection would simply occur once the payload is captured a second time, and then the second copy of the payload would be discarded.

The present disclosure thus provides a mechanism by which data integrity information is generated and checked using the same logic (as opposed to two instances of the same logic). The one-cycle window where the first copy of the payload is not protected is covered by capturing a second copy of the payload and comparing the data integrity information to the data integrity information that was already calculated and stored using the first copy of the payload.

Figure 1:
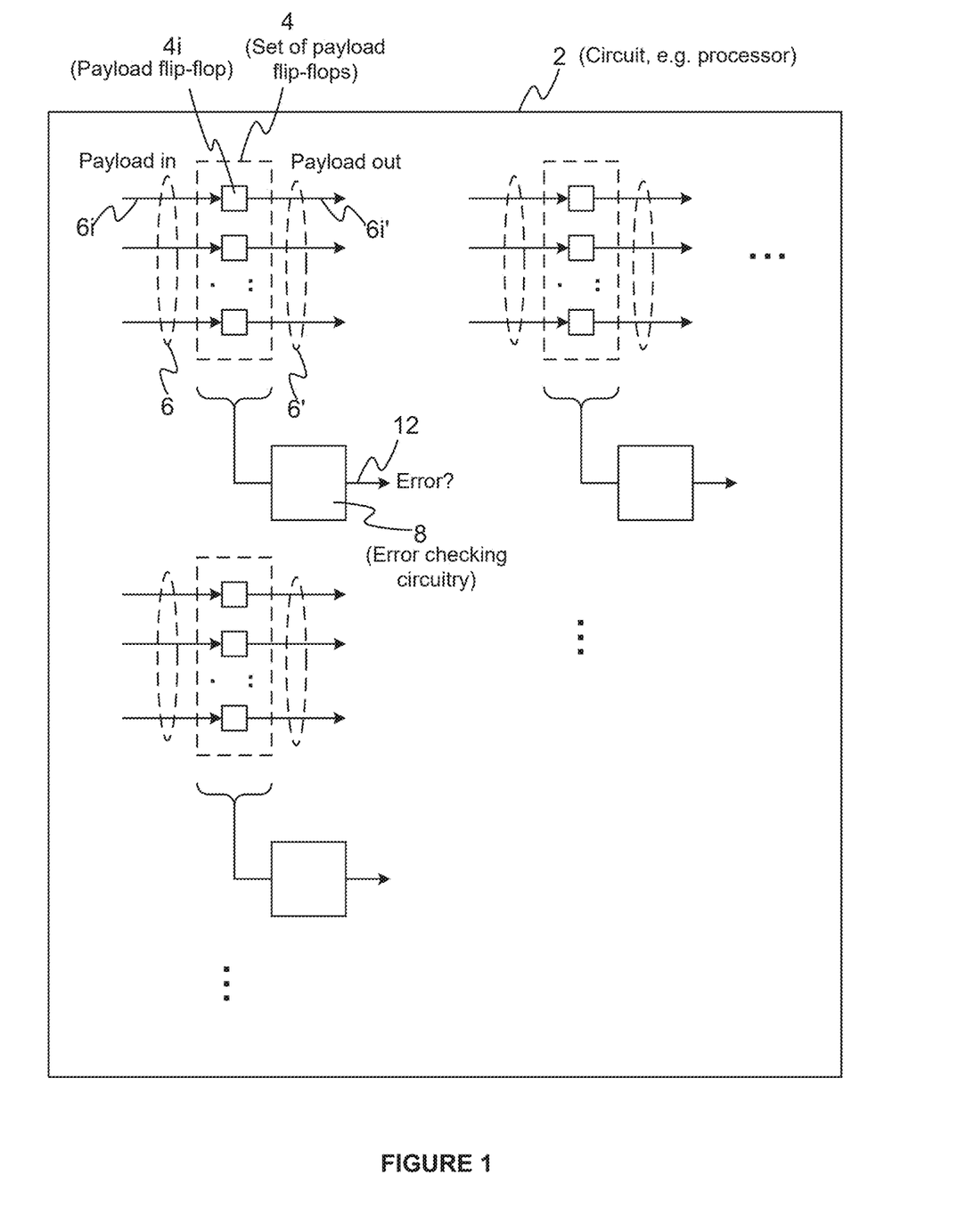
FIG. 1 is a schematic block diagram showing a processor or other circuit comprising a plurality of flip-flops and associated error checking circuitry.

FIG. 1 gives a schematic block diagram of a circuit 2 such as a processor comprising a plurality of payload flip-flops. The payload flip-flops are arranged into sets, wherein each set 4 comprises one or more individual flip-flops 4*i*. The payload flip-flops 4*i* are the flip-flops of the circuit design which carry the actual data or signal content to be protected. These could be for anything the circuit designer wishes, e.g. the flip-flops used in a stage of a processor pipeline such as an instruction fetch unit, arithmetic logic unit, a floating point unit or a load/store unit, etc.; or flip-flops employed in other parts of the processor such as memory addressing circuitry or caching logic. In embodiments the circuit 2 takes the form of a processor and may be described as such in the following Detailed Description, but it is not excluded that in other use cases the disclosed techniques could also be applied to the flip-flops in a fixed function circuit design or configurable circuit such as a PGA (programmable gate array) or FPGA (field programmable gate array), and any error checking technique disclosed in the description herein could be applied to any form of circuit design 2.

For each individual flip-flop 4*i*, a respective binary input signal 6*i* will be clocked into the flip-flop on an edge of a clock signal (either a rising or falling-edge depending on implementation), if an enable signal input to the flip-flop 4*i* is also asserted so as to enable the flip-flop at the time of the clock edge. The value held input to the flip-flop will then become available as the respective output 6*i'* of the flip-flop 4*i*. The set of input signals 6*i* for a given group of flip-flops (4) may be described as forming the input instance of the payload signal 6 of the set, and the set of corresponding binary output signals 6*i'* forms the output instance of the payload signal 6'. The flip-flops 4*i* of a given set 4 are all clocked together on the same edge of the clock signal (Ck), either the rising edge or the falling edge depending on implementation. Thus if a set of flip-flops 4 is enabled upon the relevant type of edge of the clock signal, then the input instance of the payload signal 6 will be captured into the set of payload flip-flops 4 and thus be made available as the output instance of the payload signal 6', being the version currently latched into the flip-flops 4. In principle the output instance should be the same value as the input on the cycle that it was clocked in, except that there may be a bit-flip in one or more individual flip-flops 4*i*, e.g. caused by a cosmic ray striking the flip-flop(s) 4*i* in question.

For this reason respective error checking circuitry 8 is associated with each set of payload flip-flops 4. The error checking circuitry 8 is arranged to perform an error check such as a parity check or ECC check on the flip-flops of the set 4. This will generate an error signal 12 which is asserted if the error check done on the respective set 4 fails.

Figure 2:
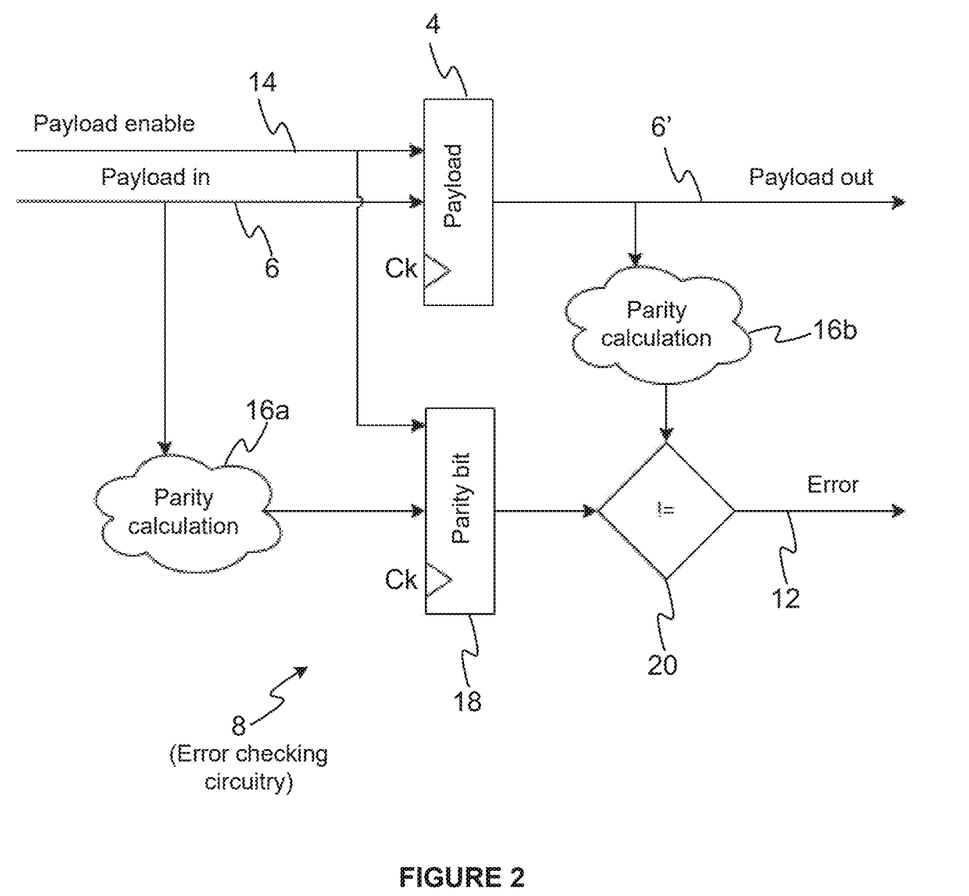
FIG. 2 is a schematic block diagram showing known error checking circuitry.

FIG. 2 illustrates a conventional implementation of the error checking 8 circuitry for a given set of flip-flops 4. The error checking circuitry 8 comprises first error-check signal generating circuitry 16*a*, second error-check signal generating circuitry 16*b*, one or more error-check flip-flops 18, and comparison circuitry 20. The associated set of payload flip-flops 4 is also shown. The conventional error check circuitry 8 works by employing the first error-check signal generating circuitry 16*a* to generate error check information (e.g. a parity bit or ECC) in the cycle preceding a payload signal being captured into the payload flip-flops 4 (with the parity/ECC information being captured alongside it). The separate, second error-check signal generating logic 16*b* then continually checks that the stored payload is consistent with the stored parity/ECC information. N.B. the following may be described with reference to parity checks, but other forms of error checking such as ECC may be used.

To elaborate on the conventional mechanism of FIG. 2, the set of flip-flops 4 is arranged to receive an input instance of the payload signal 6, which gives the value that is about to be written into the set of payload flops 4 (the value comprising one or more bits depending on how many flip-flops 4*i* are in the set 4). The input instance of the payload signal 6 is clocked into the payload flip-flops 4 on an edge (say the rising edge) of a clock signal Ck which clocks the circuitry at the level in question. The set of flip-flops 4 also takes a payload enable signal 14. If the payload enable signal 14 is asserted at the time of a rising edge of the clock signal Ck (or falling edge in other implementations), then the input instance of the payload signal 6 will be clocked into the respective flip-flops 4, meaning its value becomes latched therein such that the value of the input instance is transferred to the output instance of the payload signal 6'. For the payload 6 to be captured into the payload flops 4, the enable signal 14 needs to be raised while a clock edge (whichever type of edge is used, rising or falling) occurs in the clock signal input to the clock input (>) of the flip-flops 4.

The input instance of the payload signal 6 is also input in parallel into first parity calculation circuitry 16a, which generates a parity bit based on this and inputs the parity bit into a parity bit flip-flop 18 (could be more than one bit in the case of other types of error check). The parity bit flop 18 is enabled by the same enable signal 14 as the payload flops 4, and clocked on the same cycle of the clock signal Ck. At the output of the payload flops 4 the output instance of the payload signal 6' is input to a second, duplicate instance 16b of the parity check circuitry. A comparator 20 compares this with the parity bit that was captured into the parity flop 18 based on the input version of the payload signal 6, and if they do not match raises the error signal 12. The error checking circuitry 18 thus checks that the input version of the payload signal 6 is consistent with the output version 6'. If not, there has been a bit-flip in at least one of the payload flip-flops 4 (or possibly in the parity bit flip-flop 18).

As can be seen, the parity check circuitry (or more generally error check signal generating circuitry) 16a/16b has to be duplicated. When applied to many or all of the flip-flops in a circuit design 2, especially a large circuit such as a processor, then using separate logic for generating and checking parity or ECCs can incur a significant silicon area, as well as power overhead. There are also potential timing difficulties when it comes to practical implementation: the parity bit is typically generated toward the end of each clock cycle, and if the clock speed is being driven close to the upper limit that the circuit 2 can tolerate then then it takes most of the cycle to create the payload signal, so there is not much time left to fit in the parity check generation.

Figure 3:
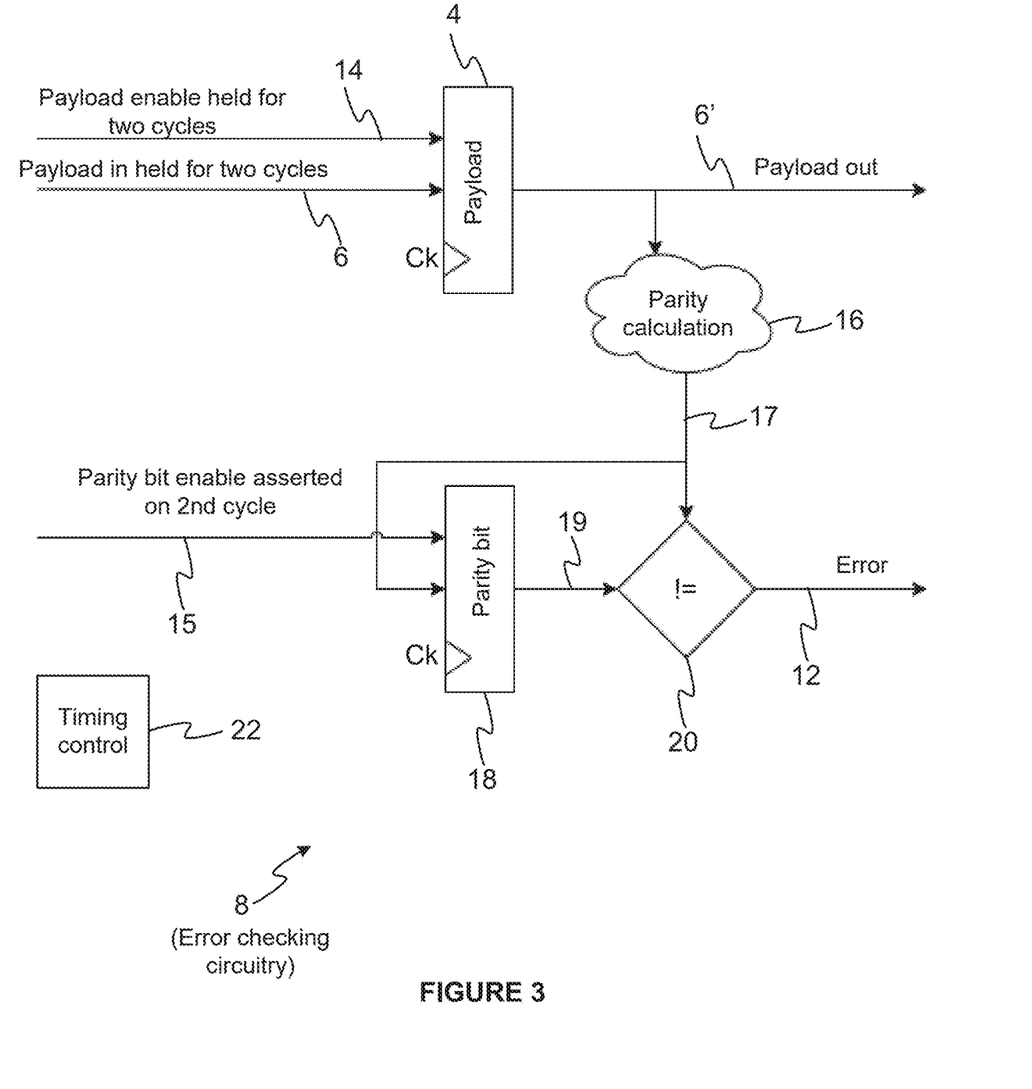
FIG. 3 is a schematic block diagram showing error checking circuitry in accordance with embodiments of the present disclosure.

As shown in FIG. 3, the present disclosure provides an alternative form of error checking circuitry which mitigates the above issues.

In the disclosed arrangement, the error check circuitry 8 for a given set of flip-flops 4 now comprises only a single instance of the error-check signal generation circuitry 16 (e.g. parity or ECC calculating circuitry). In addition, the one or more error-check flip-flops 18 is/are arranged to be enabled by a separate error-check enable signal 15, separate from the payload enable signal 14 which enables the set of payload flip-flops 4. It would also be possible to use the payload enable signal as the error-check enable signal to clock the error-check flip-flop(s) 18 (e.g. parity bit register), i.e. clock the error-check flip-flop(s)/parity bit register 18 twice, as long as the error signal is suppressed for the first cycle that the payload is in the payload register (the error in this first cycle is preferably suppressed either way, since it is deemed not valid in the first cycle).

The set of flip-flops 4 may comprise one or more flip-flops. As in FIG. 2, the set of payload flip-flops 4 is arranged to receive an input instance of a payload signal 6 comprising a respective binary signal 6i input to each of the individual payload bit flip-flops 4i in the set 4. An output instance of the payload signal 6' is output from the set 4, the output instance comprising a respective binary value 6i' as currently latched into each individual payload-bit flip-flop 4i. The set of payload flip-flops is also arranged to receive a payload enable signal 14.

A clock (not shown) is arranged to generate a clock signal Ck which, if the corresponding payload enable signal 14 is currently asserted, clocks the input instance of the payload signal 6 into the set of payload flip-flops 4 on a particular type of edge of the clock signal Ck, either a rising or a falling edge depending on implementation. The value of the input instance of the payload signal 6 thus becomes latched into set of payload flop-flops 4 (the respective value of each binary signal 6i being latched into a respective one of the individual flip-flops 4i), such that the value of the output instance of the payload signal 6' becomes equal to the input instance 6, which is held stable for a second cycle, unless there is a bit flip in one or the flip-flops 4i.

The error-check signal generating circuitry 16 is arranged to receive the output instance of the payload signal 6 from the output of the payload flip-flops 4, and to perform an operation thereon in order to generate a first instance of an error check signal 17 comprising one or more bits, depending on the type of error check to be performed. For example, the error check may be a parity check, in which case the error-check signal generating circuitry 16 performs a parity calculation (XORing together the individual bits 6i') and the error-check signal 17 is a single parity bit. Alternatively the error-check signal generator 16 could perform a more complex ECC based encoding, such that the error-check signal 17 comprises an error correction code (ECC) comprising more than one bit. As another alternative the error-check signal 17 could simply be a copy of the output payload signal 6'. In this case the error-check signal generating 16 could simply be a branch of wiring that branches off from the payload line. This would be the case for example where each set of payload flip-flops 4 comprises a single flip-flop (i.e. where an individual error-check is performed on each individual payload bit). A parity bit, ECC or copy of the payload signal could be used in the case where each set of payload flip-flops 4 comprises multiple payload flip-flops (e.g. eight payload flip-flops per error-check group 4).

Whatever form the error-check signal 17 takes, a respective set of one or more error check flip-flops 18 are arranged to receive the one or more bits of the first instance of the error check signal 17 from the error-check signal generating circuitry 16. The set of error check flip-flops 18 will consist of a single parity bit flip-flop in the case of a parity check, or multiple flip-flops in the case of an ECC (one flip-flop for each bit of the ECC). The one or more error-check flip-flops 18 is/are also arranged to receive an error-check enable signal 15, which, unlike in the arrangement of FIG. 2 is separate from the payload enable signal 14. This means that the payload enable signal 14 and error-check enable signal 15 do not always have to have the same value.

The same clock signal CK which clocks the payload flip-flops 4 also clocks the one or more error-check flip-flops 18. That is, the first instance of the error-check signal 17 will be clocked into the one or more error-check flip-flops 18 on the same edge (rising or falling) as that which clocks the payload signal 14 into the payload flip-flops—but only if the error-check enable signal 15 is asserted at the same time. Once the error-check flip-flop(s) 18 has/have been enabled and clocked in this manner, the value of the first instance of the error-check signal 17 (e.g. parity bit or ECC) gets latched into the corresponding error-check flip-flop(s) 18. The value latched into the error-check flip-flop(s) 18 is output from the error-check flip-flops as a second instance of the error-check signal 19.

The circuit 2 also comprises timing control circuitry 22. There could be individual timing control circuitry associated with each set of payload flip-flops 4 and its associated error checking circuitry 8, or the timing control circuitry 22 could be common to multiple sets of payload flip-flops 4 and their associated error circuitry 8, or a combination (part could be replicated per set of payload flip-flops 4, and part could be common to multiple sets).

The timing control circuitry 22 is configured to control the input of the payload and enable signals 6, 14 to the payload flip-flops 4, such that the input instance of the payload signal 6 is input to the set of payload flip-flops 4 in each of two cycles of the clock signal Ck, a first cycle and a second cycle following the first cycle; and the payload enable signal 14 is also asserted for the two clock cycles so as to latch the input instance of the payload signal into the payload flip-flops 4 in each of the first and second cycles. The second cycle may be the cycle of the clock immediately following the first cycle. However the disclosed error checking circuitry would also work if the two cycles are separated by one or more intermediate cycles, as long as the error signal is suppressed until after the payload is captured the second time (and the error checking bit captured alongside it).

The timing control circuitry 22 is further configured to control the timing of the error check enable signal 15, such that it is asserted on the second of the two cycles but not the first, so as to latch the first instance of the error check signal 17 into the at least one error check flip-flop on the second cycle but not the first. It would be OK to capture the error check signal 17 in the first clock cycle as well as long as the error signal 12 is ignored during that first cycle, which it may be anyway since it is not deemed valid in the first cycle.

The comparison circuitry 20 is arranged so as, at least on the second cycle, to compare the first instance of the error check signal 17 from the error check signal generating circuitry 16 with the second instance of the error check signal 19 from the one or more error check flip-flops 18. The first and second instances of the error-check signal 17, 19 should match, so if they do not this is indicative that there has been a bit flip in one of the flip-flops 4, 18 and the comparison circuitry 20 will assert the error signal 12. The error signal 12 may be deemed as not valid in the first of the two cycles (i.e. any error-handling hardware or software of the circuit 2 will ignore the error signal 12 on the first cycle, or the comparison logic 20 will include suppression logic to ensure the error signal 20 does not indicate an error during the first cycle).

Thus presently disclosed mechanism captures the payload signal twice, and uses the same logic for both generating and checking error (e.g. parity or ECC) information. This will reduce area, be less detrimental to timing, and may be less detrimental to power consumption. The parity/ECC generation may use the same calculation as the prior case of FIG. 2, but there are two clock cycles and the parity bit generation (or more generally error check signal generation) happens after the first clock edge and the check happens after the second clock edge. The payload signal is captured in one cycle and then the error (e.g. parity/ECC information) is captured in the following cycle.

Therefore now there is only one instance of the parity calculation circuitry 16 (per group of flip-flops 4), which is applied at the output of the payload flops 4. The output of this is input to the parity flip-flop or ECC flip-flops 18. The input payload signal 6 and enable signal 14 input to the parity flop are now held for two clock cycles instead of one. Thus the input payload signal 6 is captured into the payload flop 18 once on the first cycle, then captured again on the second cycle. The first cycle captures the data into the payload flops 4 in order to then calculate the parity bit or ECC and make it available on the second cycle.

The enable signal 15 as input to the parity/ECC flop(s) 18 only needs to be held on the second of these two cycles, such that the parity bit or ECC from the first cycle (the output of the error-check signal generating circuitry 16) is captured into the parity flip-flop 18 on the second cycle. The comparison circuitry 20 is now arranged to compare the output of the payload flops 4 on the second cycle with the value captured into the parity/ECC flip-flop(s) 18 on the second cycle, which is the parity bit that was generated in the first cycle (note: the error signal is suppressed until the second cycle or not deemed valid until the second cycle by whatever hardware or process is reading it).

Instead of comparing the input payload signal 6 with the output version 6' as in the conventional case of FIG. 2, the disclosed arrangement of FIG. 3 thus instead compares the output payload signal 6 from one cycle to the next. The end result is that the error checking circuitry 8 of FIG. 3 is still effectively checking the output version 6' against the input version 6 (assuming the input version 6 does not change for 2 cycles). However, instead of comparing the output 6' against the parity bit or ECC generated from the input, the disclosed mechanism is checking the second cycle's output 6' against the parity bit or ECC generated from the first cycle's version of the output 6'. If the first cycle's version of the output 6' were to be corrupted while in the payload flip-flops, the parity bit would be incorrect, and this would be flagged as an error when checked against the second cycle's version. If the second cycle's version were to be corrupted while in the payload flip-flops, the parity bit or ECC would be correct but the payload would be inconsistent with it, so this would be flagged as an error. If the input 6 were to change (be corrupted) between the first and second cycle's version of the output 6' then the parity bit or ECC would be correct (based on the first cycle's version) but the second cycle's version would be inconsistent with it, so this would be flagged as an error.

Therefore, the disclosed mechanism covers still all cases where an error can be introduced, and on all cycles. However it also saves circuitry as it does not need to duplicate the error checking circuitry 16a, 16b of FIG. 2. The trade-off is that the payload has to be held for two cycles, but this does not necessarily mean the mechanism has to be slower than that of FIG. 2, as it is possible that in some cases the circuit may be applied somewhere where the payload signal 6 only changes every 2+clock cycles anyway, so holding the input payload 6 steady comes for free. Further, the disclosed mechanism makes the error check less timing critical: conventionally, the parity bit generation has to be done right at the end of the cycle and the processor is probably being clocked close to its limit, and it takes most of the cycle to create the payload signal, so there is not much time left to fit in the parity but generation. This is not the case with the disclosed mechanism, as the parity check generation (or more generally error check signal generation) is only ever done at the output of the flip-flop(s), so the timing is not competing with the payload generation at the input.

The payload has to remain valid for two cycles, but this would not prevent the receiver of the payload from forwarding it/processing it after the first capture. The error detection would simply occur once the payload is captured a second time, and then the second copy of the payload would be discarded.

Figure 4:
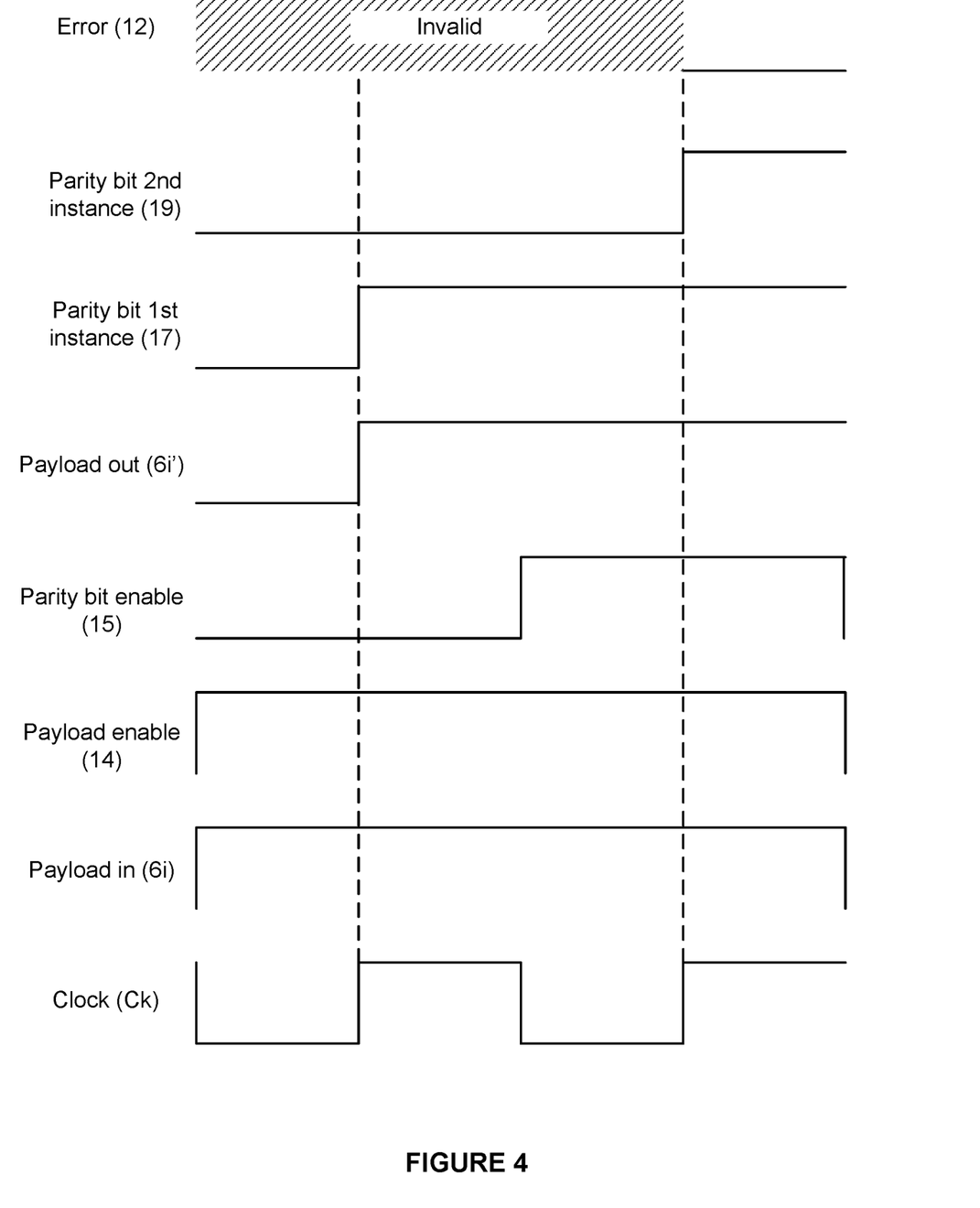
FIG. 4 is a timing diagram showing a method of operation of error checking circuitry in accordance with embodiments disclosed herein.

FIG. 4 shows a timing diagram of an example scenario in the operation of the mechanism of FIG. 3, in an example where the payload flip-flops 4 and error-check flip-flop(s) 18 are clocked on a rising edge of the clock signal Ck. By way of illustration a particular bit 6i of the payload signal 6 is shown, which in this example happens to have a value of logic 1, but it will be understood that for brevity further bits that may be part of the payload signal are not shown. By way of example the parity bit 17 in this scenario also has a resulting value of logic 1.

The disclosed mechanism may be replicated across some or all of the payload flip-flops of the design, which could be 10,000s or 100,000s of flip-flops or more, with each set of flip-flops 4 having a respective instance of the error checking circuitry 8 arranged to assert an associated error signal 12 if an error is found in the respective set of flip-flops 4. I.e. a respective instance of the error checking circuitry 8 is associated with each set 4. This could be implemented across all payload flip-flops in the design 2, or alternatively only some critical sub-group of the flip-flops, depending on the application in question. The circuit 2 may be arranged such that, if the error check 8 of any of the flip-flop sets 4 asserts its respective error signal 12, an exception (e.g. interrupt) is raised to a hardware or software exception handler (e.g. interrupt handler) and handled however required by the application or circuit design 2 in question. For example this could cause a part of the circuit 2 comprising the respective set of flip-flops 4 to be disabled, or cause the whole circuit to be disabled. E.g. in the case of a processor this could cause the processor to halt all execution, or halt execution of one or more threads that are dependent on the flip-flops 4 experiencing the error, or to run a special exception handling process. As another alternative or additional possibility, the asserted error signal 12 could cause a warning to be output to a user though a suitable user interface, such as on screen or audibly.

Depending on implementation, the error signals 12 may be independently readable to allow the handler or user to track down which set of flip-flops 4 generated the error, or alternatively the error signals 12 could just be ORed together so that the handler/user can just detect whether an error occurred or not across the whole circuit (e.g. whole processor) 2. Or a hybrid arrangement could be employed, whereby the error signals within a given group of some but not all of the sets 4 are ORed together so as to enable tracking down the error to a certain part of the circuit comprising the group (and this arrangement could be duplicated across multiple such groups).

Figure 5:
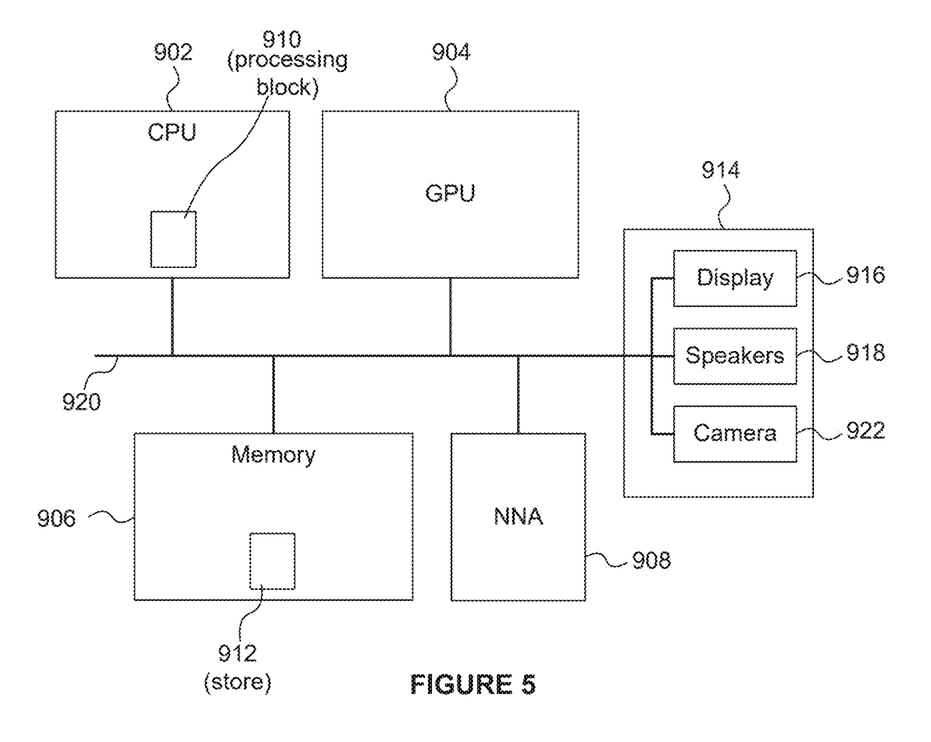
FIG. 5 shows a computer system in which a processor or other circuit is implemented.

FIG. 5 shows a computer system in which processing systems described herein may be implemented. The computer system comprises a CPU 902, a GPU 904, a memory 906, a neural network accelerator (NNA) 908 and other devices 914, such as a display 916, speakers 918 and a camera 922. A processing block 910 (comprising the processor or circuit 2 of FIGS. 1 and 3) is implemented on the CPU 902. In other examples, one or more of the depicted components may be omitted from the system, and/or the processing block 910 may be implemented on the GPU 904 or within the NNA 908. The components of the computer system can communicate with each other via a communications bus 920. A store 912 is implemented as part of the memory 906.

The circuitry of FIGS. 1 to 6 is shown as comprising a number of functional blocks. This is schematic only and is not intended to define a strict division between different logic elements of such entities. Each functional block may be provided in any suitable manner.

The processor or other circuit described herein may be embodied in hardware on an integrated circuit. The processor or circuit described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processor or other circuit configured to perform any of the methods described herein, or to manufacture a processor or circuit comprising any apparatus described herein. An integrated circuit definition dataset may be, for example, an integrated circuit description.

Therefore, there may be provided a method of manufacturing, at an integrated circuit manufacturing system, a processor or circuit as described herein. Furthermore, there may be provided an integrated circuit definition dataset that, when processed in an integrated circuit manufacturing system, causes the method of manufacturing a processor or circuit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processor or other circuit will now be described with respect to FIG. 6.

Figure 6:
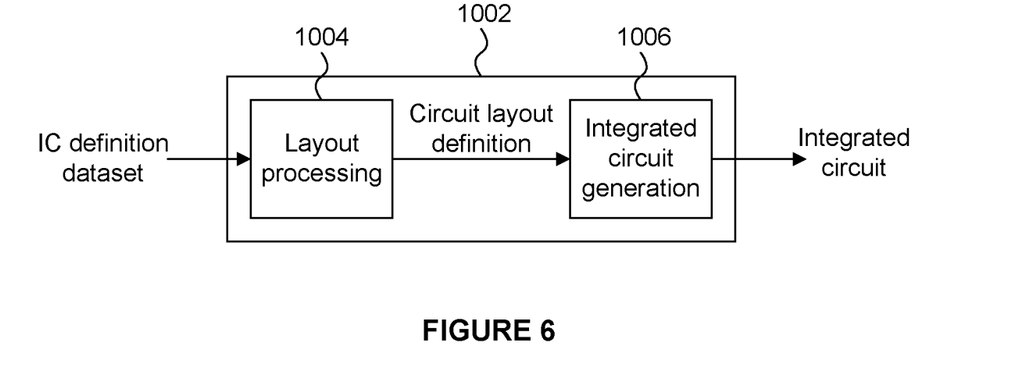
FIG. 6 shows an integrated circuit manufacturing system for generating an integrated circuit embodying a processor or other circuit.

FIG. 6 shows an example of an integrated circuit (IC) manufacturing system 1002 which is configured to manufacture a processor or circuit as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a processor or circuit as described in any of the examples herein), process the IC definition dataset, and generate an IC according to the IC definition dataset (e.g. which embodies a processor or circuit as described in any of the examples herein). The processing of the IC definition dataset configures the IC manufacturing system 1002 to manufacture an integrated circuit embodying a processor or circuit as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processor or circuit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A circuit comprising:
   a set of one or more payload flip-flops, arranged to receive an input instance of a payload signal comprising a respective binary signal being input to each of the payload bit flip-flops, and to output an output instance of the payload signal comprising a respective binary value as currently latched into each payload-bit flip-flop;
   error check signal generating circuitry arranged to perform an operation on the output instance of the payload signal to generate a first instance of an error check signal comprising one or more bits;
   a respective one or more error check flip-flops arranged to receive the one or more bits of the first instance of the error check signal from the error check signal generating circuitry, and to output a second instance of the error check signal comprising a respective binary value as currently latched into each error check flip-flop;
   a clock arranged to generate a clock signal which clocks the input instance of the payload signal into the set of payload flip-flops if a payload enable signal of the payload flip-flops is currently asserted, and which clocks the first instance of the error-check signal into the one or more error check flip-flops if an error check enable signal of the error check flip-flops is currently asserted; and
   timing control circuitry and comparison circuitry, wherein:
   the timing control circuitry is configured to input the input instance of the payload signal to the set of payload flip-flops over two cycles of the clock signal, a first cycle and a second cycle following the first cycle, and to hold the payload enable signal as asserted for the two clock cycles so as to latch the input instance of the payload signal into the payload flip-flops in each of the first and second cycles;
   the timing control circuitry is further configured to assert the error check enable signal on the second of the two cycles, so as to latch the first instance of the error check signal into the at least one error check flip-flop on the second cycle; and
   the comparison circuitry is arranged so as, at least on the second cycle, to compare the first instance of the error check signal from the error check signal generating circuitry with the second instance of the error check signal from the one or more error check flip-flops and assert an error signal if the first and second instances do not match.

2. The circuit of claim 1, wherein the set comprises a plurality of payload bit flip-flops.

3. The circuit of claim 1, wherein the operation which the error check signal generating circuitry is configured to perform comprises a parity calculation, the error check signal comprising a parity bit.

4. The circuit of claim 1, wherein the operation which the error check signal generating circuitry is configured to perform comprises an error correction code, ECC, encoding; the error check signal comprising an ECC comprising a plurality of bits.

5. A processor comprising the circuit of claim 1.

6. The processor of claim 5, wherein the circuit is duplicated multiple times across multiple respective sets of flip-flops of the processor.

7. The processor of claim 5, wherein the processor is configured so as, in response to the error signal being asserted, to perform any one or more of:
   raise an interrupt to an interrupt handler of the processor,
   halt execution of one or more threads on the processor,
   halt all execution by the processor,
   run an exception handler process,
   disable a part of the circuit comprising the set of flip-flops, or
   output a warning to a user via a user interface.

8. An integrated circuit embodying the circuit of claim 1, wherein the circuit is embodied in hardware on an integrated circuit.

9. A method of manufacturing a circuit according to claim 1, the method using an integrated circuit manufacturing system.

10. A method of manufacturing, using an integrated circuit manufacturing system, a circuit according to claim 1, the method comprising:
    processing, using a layout processing system, a computer readable dataset description of the circuit so as to generate a circuit layout description of an integrated circuit embodying the circuit; and
    manufacturing, using an integrated circuit generation system, the circuit according to the circuit layout description.

11. A non-transitory computer readable storage medium having stored thereon an integrated circuit definition dataset that, when processed in an integrated circuit manufacturing system, configures the integrated circuit manufacturing system to manufacture a circuit as set forth in claim 1.

12. A non-transitory computer readable storage medium having stored thereon a computer readable description of a circuit as set forth in claim 1 that, when processed in an integrated circuit manufacturing system, causes the integrated circuit manufacturing system to manufacture an integrated circuit embodying the circuit.

13. A non-transitory computer readable storage medium having stored thereon a computer readable dataset description of a circuit as set forth in claim 1 which, when processed in an integrated circuit manufacturing system, causes the integrated circuit manufacturing system to:
    process, using a layout processing system, the computer readable description of the circuit or processor so as to generate a circuit layout description of an integrated circuit embodying the circuit; and
    manufacture, using an integrated circuit generation system, the circuit according to the circuit layout description.

14. An integrated circuit manufacturing system configured to manufacture a circuit as set forth in claim 1.

15. An integrated circuit manufacturing system comprising:
    a non-transitory computer readable storage medium having stored thereon a computer readable dataset description of a circuit as set forth in claim 1;
    a layout processing system configured to process the computer readable description so as to generate a circuit layout description of an integrated circuit embodying the circuit; and an integrated circuit generation system configured to manufacture the circuit according to the circuit layout description.

16. A method comprising:

into a set of one or more payload flip-flops, inputting an input instance of a payload signal comprising a respective binary signal being input to each of the payload bit flip-flops, wherein the set of one or more payload flip-flops outputs an output instance of the payload signal comprising a respective binary value as currently latched into each payload-bit flip-flop;

performing an operation on the output instance of the payload signal to generate a first instance of an error check signal comprising one or more bits;

into a respective one or more error check flip-flops, inputting the one or more bits of the first instance of the error check signal, wherein the one or more error check flip-flops output a second instance of the error check signal comprising a respective binary value as currently latched into each error check flip-flop;

generating a clock signal which clocks the input instance of the payload signal into the set of payload flip-flops if a payload enable signal of the payload flip-flops is currently asserted, and which clocks the first instance of the error-check signal into the one or more error check flip-flops if an error check enable signal of the error check flip-flops is currently asserted; and inputting the input instance of the payload signal to the set of payload flip-flops over two cycles of the clock signal, a first cycle and a second cycle following the first cycle, and holding the payload enable signal as asserted for the two clock cycles so as to latch the input instance of the payload signal into the payload flip-flops in each of the first and second cycles;

asserting the error check enable signal on the second of the two cycles, so as to latch the first instance of the error check signal into the at least one error check flip-flop on the second cycle; and at least on the second cycle, comparing the first instance of the error check signal with the second instance of the error check signal and assert an error signal if the first and second instances do not match.

17. A processing system configured to perform the method as set forth in claim 16.

18. Non-transitory computer readable storage having stored thereon computer readable code configured so as to cause to be performed when run a method comprising:

into a set of one or more payload flip-flops, inputting an input instance of a payload signal comprising a respective binary signal being input to each of the payload bit flip-flops, wherein the set of one or more payload flip-flops outputs an output instance of the payload signal comprising a respective binary value as currently latched into each payload-bit flip-flop;

performing an operation on the output instance of the payload signal to generate a first instance of an error check signal comprising one or more bits;

into a respective one or more error check flip-flops, inputting the one or more bits of the first instance of the error check signal, wherein the one or more error check flip-flops output a second instance of the error check signal comprising a respective binary value as currently latched into each error check flip-flop;

generating a clock signal which clocks the input instance of the payload signal into the set of payload flip-flops if a payload enable signal of the payload flip-flops is currently asserted, and which clocks the first instance of the error-check signal into the one or more error check flip-flops if an error check enable signal of the error check flip-flops is currently asserted; and inputting the input instance of the payload signal to the set of payload flip-flops over two cycles of the clock signal, a first cycle and a second cycle following the first cycle, and holding the payload enable signal as asserted for the two clock cycles so as to latch the input instance of the payload signal into the payload flip-flops in each of the first and second cycles;

asserting the error check enable signal on the second of the two cycles, so as to latch the first instance of the error check signal into the at least one error check flip-flop on the second cycle; and at least on the second cycle, comparing the first instance of the error check signal with the second instance of the error check signal and assert an error signal if the first and second instances do not match.

\* \* \* \* \*